(12) United States Patent
Van Duijkeren et al.

(10) Patent No.: US 12,253,839 B2
(45) Date of Patent: Mar. 18, 2025

(54) METHOD AND DEVICE FOR DETERMINING AN OPTIMIZED CONTROL STRATEGY OF A MOBILE AGENT IN A DYNAMIC OBJECTS ENVIRONMENT

(71) Applicant: Robert Bosch GmbH, Stuttgart (DE)

(72) Inventors: Niels Van Duijkeren, Kornwestheim (DE); Luigi Palmieri, Leonberg (DE); Ralph Lange, Rutesheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 127 days.

(21) Appl. No.: 17/344,257

(22) Filed: Jun. 10, 2021

(65) Prior Publication Data

US 2022/0050429 A1 Feb. 17, 2022

(30) Foreign Application Priority Data

Aug. 12, 2020 (EP) .................................... 20190608

(51) Int. Cl.
*G05B 13/04* (2006.01)
*B60W 30/095* (2012.01)
*G05B 17/02* (2006.01)
*G05D 1/00* (2006.01)
*G05D 1/02* (2020.01)

(52) U.S. Cl.
CPC ....... *G05B 13/048* (2013.01); *B60W 30/0953* (2013.01); *G05B 13/041* (2013.01); *G05B 17/02* (2013.01); *G05D 1/0217* (2013.01); *G05D 1/0219* (2013.01); *B60W 2400/00* (2013.01)

(58) Field of Classification Search
CPC .... G05B 13/048; G05B 13/041; G05B 17/02; B60W 30/0953; B60W 2400/00; G05D 1/0217; G05D 1/0219; G01C 21/20
See application file for complete search history.

(56) References Cited

U.S. PATENT DOCUMENTS

| | | | |
|---|---|---|---|
| 11,577,722 B1 * | 2/2023 | Packer | G05D 1/0088 |
| 2008/0097699 A1 * | 4/2008 | Ono | B62D 15/0265 |
| | | | 701/300 |

(Continued)

OTHER PUBLICATIONS

Siebers et al., "Introduction to Multi-Agent Simulation," Cornell University, 2008, pp. 1-25. <https://arxiv.org/ftp/arxiv/papers/0803/0803.3905.pdf> Downloaded Jun. 8, 2021.

(Continued)

*Primary Examiner* — Tameem D Siddiquee
(74) *Attorney, Agent, or Firm* — NORTON ROSE FULBRIGHT US LLP; Gerard A. Messina

(57) ABSTRACT

A computer-implemented method for determining an appropriate control strategy for a mobile agent for an environment with one or more dynamic objects. The method includes: providing a number of different scenarios wherein to each of the scenarios a number of dynamic objects is associated, wherein for each of the scenarios, each of the dynamic objects is associated with a start, a goal and a behavior specification; providing a number of control strategy candidates for the mobile agent; benchmarking each of the control strategy candidates in any of the scenarios; selecting the control strategy for the mobile agent depending on the result of the benchmarking of the control strategy candidates.

8 Claims, 1 Drawing Sheet

(56) References Cited

U.S. PATENT DOCUMENTS

2017/0123421 A1* 5/2017 Kentley ............... G05D 1/0088
2018/0172450 A1* 6/2018 Lalonde ............. G01C 21/3407
2019/0235512 A1* 8/2019 Sinyavskiy .......... G05D 1/0217
2021/0240191 A1* 8/2021 Cesafsky ............. G05D 1/0016

OTHER PUBLICATIONS

Helbing et al., "Social Force Model for Pedestrian Dynamics," Cornell University, Physical Review, 1995, vol. 51, Issue 5, pp. 1-18. <https://arxiv.org/pdf/cond-mat/9805244.pdf> Downloaded Jun. 8, 2021.

* cited by examiner

METHOD AND DEVICE FOR DETERMINING AN OPTIMIZED CONTROL STRATEGY OF A MOBILE AGENT IN A DYNAMIC OBJECTS ENVIRONMENT

CROSS REFERENCE

The present application claims the benefit under 35 U.S.C. § 119 of European Patent Application No. EP 20190608.8 filed on Aug. 12, 2020, which is expressly incorporated herein by reference in its entirety.

FIELD

The present invention relates to determination of suitable control strategies for motion planning of a mobile agent in a multi-agent and/or multiple dynamic object environment, particularly in an environment where concurring agents move based on a non-random behavior.

BACKGROUND INFORMATION

Basically, in real-world environments, the motion planning of a mobile agent has to consider multiple dynamic objects exhibiting human-like or any other kind of intelligent behavior, such as pedestrians or individuals steering a vehicle. Conventional methods for simulating dynamic objects can be categorized in the discrete event simulations (DES), system dynamics (SD) and agent-based simulation (ABS), as, e.g., described in Siebers, P. O. et al., "Introduction to Multi-Agent Simulation", 2008, Encyclopedia of Decision Making and Decision Support Technologies, pages 554 to 564, IGI Global. While DES and ABS are not common in robotics as they simulate high-level behaviors instead of punctual movements, SD methods are more popular and make use of explicit models for simulated dynamic objects movements in the future.

As, e.g., described in Helbing, D. et al., "Social Force Model for Pedestrian Dynamics", Physical Review, 1995, 51(5), page 4282, the social force model is common choice for simulating groups and crowds of pedestrians for attracting and repulsive forces are used to model pedestrians' motions. Different behaviors of the dynamic objects can be simulated by modifying gains of the attracting and repulsive forces.

In the conventional Optimal Reciprocal Collision Avoidance (ORCA) algorithm, collaborative behavior for a multi-agent system can be simulated in which each agent optimizes its motion path considering also the others with the assumption that all of the dynamic objects behave similarly. However, this approach can only represent collaborative or not collaborative behaviors during simulation.

SUMMARY

According to the present invention, a computer-implemented method for a motion planning of an agent and a device and an agent are provided.

Further embodiments are disclosed herein.

According to a first aspect of the present invention, it is provided a computer-implemented method for determining an appropriate control strategy for a mobile agent for an environment with one or more dynamic objects. In accordance with an example embodiment of the present invention, the method includes the following steps:

Providing a number of different scenarios wherein to each of the scenarios a number of dynamic objects is associated, wherein for each of the scenarios, each of the dynamic objects is associated with a start, a goal and a behavior specification;

Providing a number of control strategy candidates for the mobile agent;

Benchmarking each of the control strategy candidates in each of the scenarios;

Selecting the control strategy for the mobile agent depending on the result of the benchmarking of the control strategy candidates.

It may be provided that each control strategy candidate optimizes a cost function or is rule-based to optimize a motion trajectory for the mobile agent in the environment with the dynamic objects.

Furthermore, in accordance with an example embodiment of the present invention, the benchmarking of each of the candidates in every scenario may be performed depending on the results of optimization problems to reflect the behaviors of the dynamic objects, the mobile agent 1 may face during the application of the respective control strategy candidate in the benchmarking process. The optimization can be performed repeatedly and simultaneously with the ongoing benchmark. The reason is that the exact behaviors (in terms of trajectories) of the dynamic objects depends on the trajectory of mobile agent.

Configuration of an autonomous mobile agent is usually made by selecting an appropriate control strategy. The control strategy may be selected among a number of suitable control strategies each of which performing differently in different environments. Particularly, assessment of a control strategy is especially difficult when dynamic objects are present in the environment each of which following its own more or less intelligent policy. Assessment of a control strategy is particularly problematic if the dynamic objects show a kind of intelligence or even interact with the mobile agent.

So, dynamic objects may anticipate the intentions in the future motions of the mobile agent, so that it can exhibit some degree of collaboration to facilitate the mobile agent to fulfill its task. Furthermore, the dynamic objects perform certain tasks by themselves which dictate the motion pattern they follow and thereby the nature and frequency of interactions with the agent. Doing so, they actively weigh the priority of their tasks against the task of the mobile agent.

In general, the control strategy implementation details do not need to be known to be able to do a benchmark as the modelled behavior of the dynamic objects is independent thereof. Therefore, the benchmark should work regardless of whether the control strategy candidate is rule-based or optimization-based.

Furthermore, the dynamic objects may move in a physically consistent manner which take into account the physical limitations according to the speed, acceleration, pivoting limits of different kinds of dynamic objects such as pedestrians, vehicles and the like. Moreover, the behavior may also include the collaboration of multiple dynamic objects as a team to achieve a certain task or possibly collaborate with the mobile agent.

In general the specific setup of the environment including setup and tasks of a number of dynamic objects, such as their individual control strategies, their start and their goal positions is not known at the time of configuring the mobile agent, especially for selection of the control strategy. The above method, in accordance with an example embodiment of the present invention, applies a benchmarking of control strategies for controlling a mobile agent with a model predictive control to facilitate the consideration of intelligent behavior of dynamic objects in the environment. The benchmarking uses a model predictive control based on a cost function taking into account the action strategies of the dynamic objects. The action strategies are indicated by a behavior indicator indicating an effect of the presence and movement of the dynamic object according to an intelligent behavior on the motion planning of the mobile agent. Particularly, the behavior indicator is a metric for associating a collaborative, neutral or sabotage behavior of the respective dynamic object.

Furthermore, the behavior of the dynamic objects also follows a cost function which may also be considered in the cost function for the mobile agent when evaluating the benchmark of the control strategy. Particularly, the stage costs of all dynamic objects are taken into account in a weighted manner. Weighing the cost functions of the dynamic objects allows tuning different levels of cooperativity which is expected or known from individual dynamic objects by implementing efficient model predictive control algorithms.

Moreover, the control strategy candidates may comprise at least some of: Dynamic Window Approach, elastic bands and Timed elastic Bands.

It may be provided that the result of the benchmarking is a benchmark indicator for each of the control strategy candidates being a function of one or more key performance indicators, which may include at least one of a minimum distance between different agents, an overall time to complete a task or to reach a goal, respectively, a distance measure to a desired path to follow, a control effort measure, an energy consumption for each of the scenarios, particularly a mean of all cost values of the scenarios for each individual control strategy candidate.

BRIEF DESCRIPTION OF THE DRAWINGS

Example embodiments of the present invention are described in more detail in conjunction with the figures.

DETAILED DESCRIPTION OF EXAMPLE EMBODIMENTS

Figure 1:
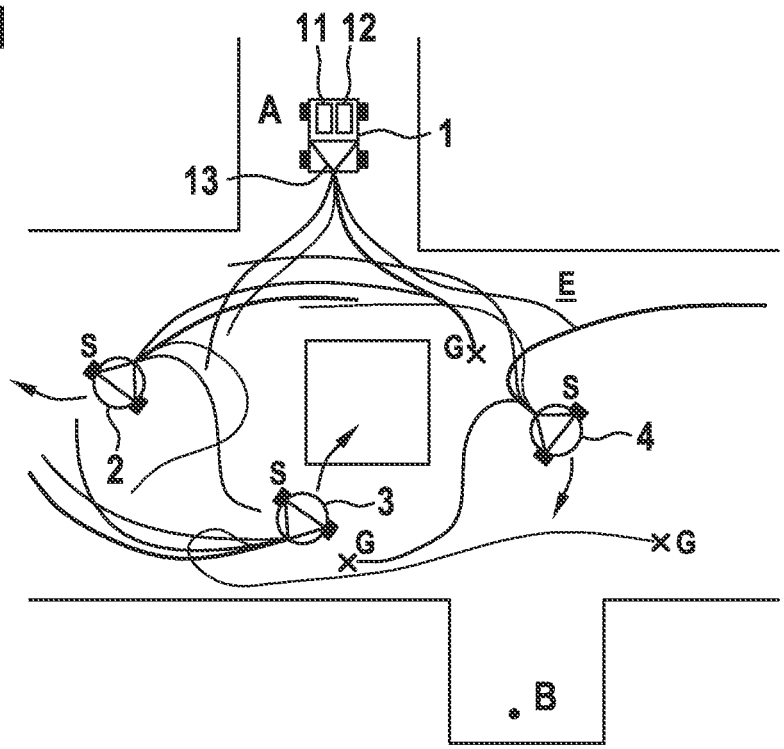
FIG. 1 shows schematically an illustration of different actors in a restrictive environment wherein a mobile agent shall move to a goal considering predictive movements of other dynamic objects.

FIG. 1 shows a system of a mobile agent 1 having a task to move through an environment E from position A to position B. In the environment E dynamic objects 2, 3, 4 may move performing their own tasks. The dynamic objects 2, 3, 4 may be further mobile agents or individuals each showing a kind of intelligent task driven behavior. The intelligent behavior of the dynamic objects 2, 3, 4 may follow a policy considering actions of the mobile agent 1 and/or other dynamic objects 2,3,4.

The mobile agent 1 may have a configuration as it is schematically shown in FIG. 1. The mobile agent 1 has a control unit 11 that is configured to perform the subsequently described method and controls movement of the agent 1 along a planned trajectory among others.

The control unit 11 may have a microprocessor or a microcontroller as well as a memory for storing data and an algorithm code. Furthermore, the mobile agent 1 has an actuation unit 12 for interaction with the environment, for instance the actuation unit 12 may include a traction motor for driving wheels of the mobile agent 1 to move the mobile agent 1 in the environment E. The actuation unit 12 is controlled by the control unit 11.

Furthermore, the mobile agent 1 may include a sensor system 13 for sensing the environment E, particularly to detect other objects and structures which may allow the localization of the mobile agent 1 in the environment and to identify dynamic objects and their poses in the environment E. The sensor system 13 may include radar, Lidar, and/or cameras to scan the environment E surrounding the mobile agent 1.

When configuring such a mobile agent 1 a control strategy has to be selected and installed which allows the mobile agent 1 to autonomously perform its task in the environment E. The control strategy should have implemented a collision avoidance/handling to prevent motion trajectories where a collision with another dynamic object is likely, and/or to cope with collisions.

In simulation-based benchmarking of navigation algorithms for mobile agents, it is generally difficult to effectively model the behavior of the dynamic objects 2, 3, 4. This behavior of each of the dynamic objects 2, 3, 4 may contribute to or in fact disturb the performing of the task of the mobile agent 1.

Figure 2:
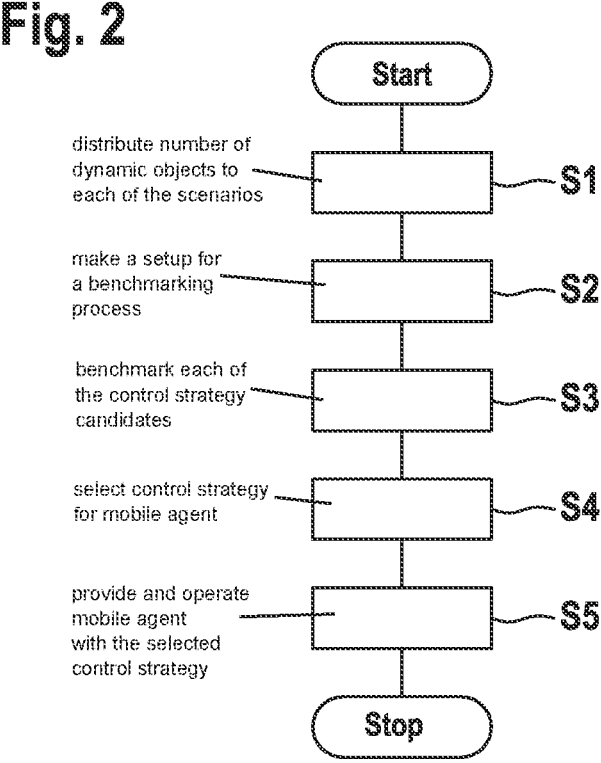
FIG. 2 shows a flow chart illustrating a method for determining an appropriate control strategy, in accordance with an example embodiment of the present invention.

For determining the appropriate control strategy for the mobile agent 1 a method is performed, e.g. on a data processing system, as it is described in more detail in the flowchart of FIG. 2. The control strategy shall be adapted to a given environment with one or more dynamic objects 2, 3, 4 each of which may have its own behavior determined by their own control schemes. The behaviors are more or less depending on the motion of the mobile agent 1 when it comes to an interference of their motions and/or to a potential collision with the mobile agent 1.

In step S1 it is provided a number of differing scenarios wherein to each of the scenarios a number of dynamic objects 2, 3, 4 being distributed in the environment E. To each of the dynamic objects 2,3, 4 it is associated a start S and a goal G for a motion task, behavior characterizing the policy of its respective action and being indicated by a behavior indicator.

In step S2 there is made a setup for a benchmarking process wherein a number of control strategy candidates for the mobile agent 1 is provided, wherein each control strategy candidate may apply a cost function to optimize a motion trajectory for the mobile agent 1 in the environment with the dynamic objects 2, 3, 4 or a rule based strategy. The control strategy candidates may include Elastic Bands (EB), Dynamic Window Approach (DWA), Timed Elastic Bands (TEB).

The optimization can be performed repeatedly and simultaneously with the ongoing benchmark. The reason is that the exact behavior (in terms of trajectories) of the dynamic objects 2, 3, 4 depends on the trajectory of mobile agent 1.

Basically, EB, DWA and TEB aim to plan the motion of a mobile agent 1 along a given horizon while minimizing a given cost function and while adhering to kinodynamic constraints of the mobile agent 1. After commanding the first control action to the mobile agent 1, the optimization is continuously repeated which is known in control theory as model predictive control. As computing of the optimal solution is demanding, the above indicated approaches approximate the optimal solution with different optimization strategies.

The DWA performs a sample-based optimization. It samples a control action and rolls out the trajectory for these particular sampled actions by simulating them according to a specified horizon length based on the agent's motion model. After rolling out predictions for all samples, the best motion trajectory is selected based on a specified cost function and constraints.

The TEB primarily tries to seek for the time-optimal solution. The approach discretizes the trajectory along the prediction horizon in terms of time and applies a continuous numerical optimization scheme. TEB is able to optimize multiple trajectories in different topologies at once in order to find the solution. Since the approach relies on continuous optimization, the cost function must be smooth.

In step S3 each of the control strategy candidates is benchmarked in scenarios with different kinds/behaviors of dynamic objects 2, 3, 4. The behavior of the dynamic objects 2, 3, 4 is defined and tuned by an optimal control problem as introduced below. It can describe different degrees of cooperativity of the dynamic objects 2, 3, 4.

Each of the control strategy candidates may be benchmarked depending on a predefined key performance indicator, representing e.g. a minimum distance between different agents, an overall time to complete a task or to reach a goal, respectively, a distance measure to a desired path to follow, a control effort measure, an energy consumption or the like in each of the number of scenarios, such as depending on the time to complete the given task.

The key performance indicator is determined based on an optimization problem to reflect "intelligent-like" behavior of the dynamic objects 2, 3, 4 the mobile agent 1 may face during the application of the control strategy candidate in the benchmarking process.

Let $x_k \in \mathbb{R}^{n_x}$ denote the state of the system model of the dynamic objects 2, 3, 4 at timestep k, $u_k \in \mathbb{R}^{n_u}$ its control degree of freedom, and $E \in \mathbb{R}^{n_E}$ a set of parameters that encode relevant environmental aspects such as the collision-free space. Furthermore, for a set $\mathcal{J}$ including the mobile agent 1 and the dynamic objects 2, 3, 4, external actors $$z_k^i \in \mathbb{R}^{n_z^i}$$

denotes the state of actor $i \in \mathcal{J}$ and $v_k^i \in \mathbb{R}^{n_v^i}$ its control degree of freedom. For example, for dynamic object 2, the external actors are denoted by 1, 3, and 4. The dynamic behavior of the dynamic object is governed by the difference equation f: $\mathbb{R}^{n_x} \times \mathbb{R}^{n_u} \to \mathbb{R}^{n_x}$, the model may considered to be a perfect representation of the plant. Let the dynamic behavior of dynamic object i be governed by the difference equation $f^i$:

$$\mathbb{R}^{n_z^i} \times \mathbb{R}^{n_x} \to \mathbb{R}^{n_z^i},$$

in the simulation environment it is possible that the mobile agent 1 and the dynamic objects 2, 3, 4 are not known exactly, e.g. governed by a higher-fidelity model.

The to be determined optimal control strategy is defined by a cost function J that consists of the sum of stage costs $J_0, \ldots, J_{N-1}$:

$$\mathbb{R}^{n_x} \times \mathbb{R}^{n_u} \times \prod_{i \in \mathcal{J}} \mathbb{R}^{n_z^i} \times \mathbb{R}^{n_E} \to \mathbb{R}$$

and the terminal cost $J_N$:

$$\mathbb{R}^{n_x} \times \prod_{i \in \mathcal{J}} \mathbb{R}^{n_z^i} \times \mathbb{R}^{n_E} \to \mathbb{R},$$

the difference equations for the respective dynamic objects 2, 3, 4, the vector fields of inequality constraints $h_0, \ldots, h_N$, and the model of the behavior of the other actor described by a minimization/optimization problem for every actor. The inequality constraints can encode for instance the mutual collision avoidance between all actors between each other and the environment (encoded by E), but they also specify physical limits of the mobile agent 1 and the other dynamic objects 2, 3, 4 (acceleration, velocity, steering angles, etc.). Consider the structure of the (bi-level) optimal control problem below:

$$\underset{x_{0 \ldots N}, u_{0 \ldots N-1}}{\text{minimize}} \quad J\left(x_{0 \ldots N}, u_{0 \ldots N-1}, \{z_{0 \ldots N}^i\}_{i \in \mathcal{J}}, E\right)$$

$$\text{subject to} \quad x_{k+1} = f(x_k, u_k), \; x_0 = \bar{x} \qquad k = 0, \ldots, N-1$$

$$h_k\left(x_k, u_k, \{z_k^i\}_{i \in \mathcal{J}}, E\right) \leq 0 \qquad k = 0, \ldots, N-1$$

$$h_N\left(x_k, \{z_k^i\}_{i \in \mathcal{J}}, E\right) \leq 0$$

$$z_{0 \ldots N}^i = \underset{z_{0 \ldots N}^i, v_{0 \ldots N-1}^i}{\arg\min} \quad J^i\left(z_{0 \ldots N}^i, v_{0 \ldots N-1}^i, x_{0 \ldots N}, \{z_{0 \ldots N}^j\}_{j \in \mathcal{J} \setminus i}, E\right)$$

$$\text{subject to} \quad z_{k+1}^i = f^i(z_k^i, v_k^i), \; z_0^i = \bar{z}^i \qquad k = 0, \ldots, N-1 \quad \forall i \in \mathcal{J}$$

$$h_k^i\left(z_k^i, v_k^i, x_k, \{z_k^j\}_{j \in \mathcal{J} \setminus i}, E\right) \leq 0 \qquad k = 0, \ldots, N-1$$

$$h_N^i\left(z_k^i, x_k, \{z_k^j\}_{j \in \mathcal{J} \setminus i}, E\right) \leq 0$$

Where from the perspective of dynamic object 2 $\bar{x}$, $\{\bar{z}^i\}_{i\in\mathcal{J}}$ represent the currently measured or estimated states of the ego vehicle: dynamic object 2 and the external actors: mobile agent 1 and dynamic objects 3, 4, respectively. Every dynamic object 2, 3, 4 solves this optimization problem. The respective dynamic object's ego state is denoted by $\bar{x}$. The $\{\bar{z}^i\}_{i\in\mathcal{J}}$ variables denote the states of the "external actors" with respect to the respective dynamic object 2, 3, 4, this includes the mobile agent 1. Particularly the trajectories $\{\hat{z}_{0...N}^i\}_{i\in\mathcal{J}}$ denote the expected behavior of the other agents driven by an approximation of their objective, dynamics and constraints.

In the shown example, if the optimization shall be made from the perspective of dynamic object 2. The external actors are the mobile agent, the dynamic object 3 and the dynamic object 4. Likewise, from the perspective of dynamic object 3 the external actors are the mobile agent 1, the dynamic object 2, and the dynamic object 4.

The aim is to let the solution of this optimal control problem exhibit the desired tunable behavior of the dynamic objects. If for instance that the dynamic object is aware of the cost function that is being optimized by the mobile agent 1 and the other dynamic objects, or that it at least has a reasonable approximation thereof. The stage cost for stage k can be for instance be defined as a weighted sum of the isolated stage costs of all agents using the weighting coefficients $\{\alpha_k^i\}_{i\in\mathcal{J}}$:

$$J_k(x_k, u_k, \{\hat{z}_k^j\}_{i\in\mathcal{J}}, E) := \phi_k(x_k, u_k, E) + \sum_{i\in\mathcal{J}} \alpha_k^i \psi_k^i(\hat{z}_k^i, E)$$

where $\phi_k$ denotes the stage cost for the dynamic object that will effectively achieve the task as this cost function is minimized, whereas $\psi_k^i$ denotes the (estimated) stage cost of the external actors. This cost function can effectively encode different kinds of cooperative behavior, consider that actor $i=1\in\mathcal{J}$ refers to the benchmarked mobile agent 1, examples include:

Cooperative behavior: $\alpha_k^i=1$ $\forall k$, $i\in\mathcal{J}$.
Non-cooperative (greedy) behavior: $\alpha_k^i=0$ $\forall k$, $i\in\mathcal{J}$.
Sabotage benchmarked robot: $\alpha_k^1=-1$ $\forall k$, $\alpha_k^i=0$ $\forall k$, $i\in\mathcal{J}\setminus 1$, and $\phi_k:=0$ $\forall k$.
The $\{\alpha_k^i\}_{i\in\mathcal{J}}$ are selected by some priority-assignment scheme.

The dynamic objects can be assumed to have perfect knowledge of the current state of itself $\bar{x}$ and the other actors $\{\bar{z}_i\}_{i\in\mathcal{J}}$ by querying the global state of the simulator. Similarly, for the state of the environment E, the global state of the simulator can be queried without limitations. The model predictive control algorithm solves the optimal control problem in above equations at a fixed control rate of e.g. 10 Hz based on new states of the dynamic objects, the external actors and the environment. Every time it applies it executes the first part of the optimized trajectory $u_k$ only, as is common in model predictive control.

In step S4 the control strategy for the mobile agent 1 is selected depending on the result of the benchmarking of the control strategy candidates. The result of the benchmarking can be a benchmark indicator for each of the control strategy candidates wherein the benchmark indicator is obtained by means of a given function of the optimized cost values for each of the scenarios such as a mean of all cost values of the scenarios for each individual control strategy candidate. The result of the benchmarking may be different for every scenario and behavior of the dynamic objects.

In step S5 the mobile agent 1 is provided with the selected control strategy and operated therewith.

Finally, the control strategy candidate having the best benchmark result for the intended use-case can be used for configuration of the mobile agent 1.

What is claimed is:

1. A computer-implemented method for determining an appropriate control strategy for a mobile agent for an environment with a plurality of dynamic objects, comprising the following steps:
   providing a number of different scenarios, wherein, to each of the scenarios a plurality of dynamic objects is associated, wherein for each of the scenarios, each of the dynamic objects of the plurality of dynamic objects is associated with a start, a goal, and a behavior specification;
   providing a number of control strategy candidates for the mobile agent;
   benchmarking each of the control strategy candidates in any of the scenarios; and
   selecting a control strategy for the mobile agent depending on a result of the benchmarking of the control strategy candidates,
   wherein the benchmarking of each respective control strategy candidate of the control strategy candidates in every scenario is performed depending on results of optimization problems to reflect behaviors of each dynamic object of the plurality of dynamic objects the mobile agent may face during application of the respective control strategy candidate in the benchmarking, wherein the behaviors of each dynamic object of the plurality of dynamic objects is defined by an optimal control problem which results in a tuning of the behaviors of each dynamic object of the plurality of dynamic objects, wherein the optimization is performed simultaneously with the benchmarking for each dynamic object of the plurality of dynamic objects,
   wherein each of the control strategy candidates applies a cost function or is rule-based to optimize a motion trajectory for the mobile agent in the environment with the plurality of dynamic objects, and
   controlling the mobile agent based on the selected control strategy.

2. The method according to claim 1, wherein the optimization is performed repeatedly with the benchmarking.

3. The method according to claim 1, wherein the control strategy candidates include at least one of the following: a Dynamic Window Approach, an Elastic Band method, and a Timed Elastic Band method.

4. The method according to claim 1, wherein the result of the benchmarking is a benchmark indicator for each of the control strategy candidates.

5. The method according to claim 1, wherein the result of the benchmarking is obtained by means of a function of one or more key performance indicators, including optimized cost values, for each of the scenarios, including a mean of all cost values of the scenarios for each individual control strategy candidate.

6. A device for determining an appropriate control strategy for a mobile agent for an environment with a plurality of dynamic objects, wherein the device is configured to:
   provide a number of different scenarios, wherein, to each of the scenarios, a plurality of dynamic objects is associated, wherein for each of the scenarios, each of the dynamic objects of the plurality of dynamic objects is associated with a start, a goal, and a behavior specification;

providing a number of control strategy candidates for the mobile agent;

benchmarking each of the control strategy candidates in any of the scenarios; and selecting the control strategy for the mobile agent depending on a result of the benchmarking of the control strategy candidates, wherein the benchmarking of each respective control strategy candidate of the control strategy candidates in every scenario is performed depending on results of optimization problems to reflect behaviors of each dynamic object of the plurality of dynamic objects the mobile agent may face during application of the respective control strategy candidate in the benchmarking, wherein the behaviors of each dynamic object of the plurality of dynamic objects is defined by an optimal control problem which results in a tuning of the behaviors of each dynamic object of the plurality of dynamic objects, wherein the optimization is performed simultaneously with the benchmarking for each dynamic object of the plurality of dynamic objects, wherein each of the control strategy candidates applies a cost function or is rule-based to optimize a motion trajectory for the mobile agent in the environment with the plurality of dynamic objects, and controlling the mobile agent based on the selected control strategy.

7. A computer program product, comprising:

a non-transitory computer readable medium on which is stored a computer program code for determining an appropriate control strategy for a mobile agent for an environment with a plurality of dynamic objects, the control program code, when executed by a computer, cause the computer to perform the following steps:

providing a number of different scenarios, wherein, to each of the scenarios a plurality of dynamic objects is associated, wherein for each of the scenarios, each of the dynamic objects of the plurality of dynamic objects is associated with a start, a goal, and a behavior specification;

providing a number of control strategy candidates for the mobile agent;

benchmarking each of the control strategy candidates in any of the scenarios; and selecting a control strategy for the mobile agent depending on a result of the benchmarking of the control strategy candidates, wherein the benchmarking of each respective control strategy candidate of the control strategy candidates in every scenario is performed depending on results of optimization problems to reflect behaviors of each dynamic object of the plurality of dynamic objects the mobile agent may face during application of the respective control strategy candidate in the benchmarking, wherein the behaviors of each dynamic object of the plurality of the dynamic objects is defined by an optimal control problem which results in a tuning of the behaviors of each dynamic object of the plurality of the dynamic objects, wherein the optimization is performed simultaneously with the benchmarking for each dynamic object of the plurality of dynamic objects, wherein each of the control strategy candidates applies a cost function or is rule-based to optimize a motion trajectory for the mobile agent in the environment with the plurality of dynamic objects, and controlling the mobile agent based on the selected control strategy.

8. A non-transitory machine readable medium on which is recorded a program for determining an appropriate control strategy for a mobile agent for an environment with a plurality of dynamic objects, the program, when execute by a computer, causing the computer to perform the following steps:

providing a number of different scenarios, wherein, to each of the scenarios a plurality of dynamic objects is associated, wherein for each of the scenarios, each of the dynamic objects of the plurality of dynamic objects is associated with a start, a goal, and a behavior specification;

providing a number of control strategy candidates for the mobile agent;

benchmarking each of the control strategy candidates in any of the scenarios; and selecting a control strategy for the mobile agent depending on a result of the benchmarking of the control strategy candidates, wherein the benchmarking of each respective control strategy candidate of the control strategy candidates in every scenario is performed depending on results of optimization problems to reflect behaviors of each dynamic object of the plurality of dynamic objects the mobile agent may face during application of the respective control strategy candidate in the benchmarking, wherein the behaviors of each dynamic object of the plurality of the dynamic objects is defined by an optimal control problem which results in a tuning of the behaviors of each dynamic object of the plurality of the dynamic objects, wherein the optimization is performed simultaneously with the benchmarking for each dynamic object of the plurality of dynamic objects, wherein each of the control strategy candidates applies a cost function or is rule-based to optimize a motion trajectory for the mobile agent in the environment with the plurality of dynamic objects, and controlling the mobile agent based on the selected control strategy.

\* \* \* \* \*